United States Patent

Hervig

[11] Patent Number: 5,901,617
[45] Date of Patent: May 11, 1999

[54] PEDAL WITH CUSHIONED SUPPORT

[76] Inventor: Dana P. Hervig, 1450 102nd St., E. Inver Grove Heights, Minn. 55077

[21] Appl. No.: 08/888,521

[22] Filed: Jul. 7, 1997

[51] Int. Cl.$^6$ ............... G05G 1/14; A63B 22/06
[52] U.S. Cl. ............................. 74/594.4; 482/57
[58] Field of Search ............ 74/594.4, 594.7; 482/57; 248/562, 633, 634

[56] References Cited

U.S. PATENT DOCUMENTS

| | | | |
|---|---|---|---|
| 4,025,676 | 5/1977 | Koellisch | 428/40 X |
| 4,599,915 | 7/1986 | Hlavac | 74/594.4 |
| 4,973,046 | 11/1990 | Maxwell | 74/594.7 |
| 5,142,938 | 9/1992 | Sampson | 74/594.4 |
| 5,251,508 | 10/1993 | Robbins | 74/594.4 |
| 5,449,332 | 9/1995 | Hervig | 482/57 |
| 5,553,516 | 9/1996 | Weiss | 74/594.6 X |

*Primary Examiner*—Richard M. Lorence
*Assistant Examiner*—Brandon C. Stallman

[57] ABSTRACT

A pedal has a housing with first and second oppositely disposed ends and a socket-shaped support between the ends which serves as a heel to toe axis and multi-directional pivoting support. A rotatable shaft positioned within the housing has a first end connectable to a crank. A pedal frame contains a ball-shaped extension that is press fit into the socket-shaped support for heel to toe axis and multi-directional pivoting. A cushion pad is adhesively attached to the shaft housing and seperated from the underside of pedal frame by a separation sheet made from a slippery material to let the pedal frame rotate in different directions with minimal friction from the cushion pad.

11 Claims, 3 Drawing Sheets

5,901,617

PEDAL WITH CUSHIONED SUPPORT

TECHNICAL FIELD

This invention relates to a pedal which provides cushioning and pivoting within a pedal to give a cyclist's foot the ability to simultaneously position freely on a heel to toe axis and in multiple directions. For example, the foot can freely pivot on a heel to toe axis and change between toe-in and toe-out positioning while maintaining the benefit of support from the pedal's cushioning. The pedal can be used with bicycles and exercise equipment to provide improved foot positioning and better weight distribution across the foot than a conventional pedal.

BACKGROUND OF THE INVENTION

Pedals that allow feet to pivot for improved weight distribution or comfort and pedals that use supplemental cushioning are described in detail by the references; for example U.S. Pat. Nos. 5,449,332 and 4,599,915. Imbalanced weight distribution of the foot causes unnecessary compensation by leg muscles and joints to correct the foot's imbalance and keep legs properly aligned for efficient pedaling. The following invention allows improved foot positioning on more than one axis in conjunction with cushioning supplementation adapted for multi-directional foot positioning.

SUMMARY OF THE INVENTION

A pedal described here includes a shaft housing having first and second oppositely disposed ends and a socket-shaped support positioned between the ends; a rotatable shaft positioned within the shaft housing having a first end connectable to a crank; and a pedal frame containing a ball-shaped extension that is pivotally mounted to the socket-shaped support of the shaft housing for heel to toe axis and multi-directional pivoting. An adhesive backed cushion pad is adhesively attached to the shaft housing and the non-adhesive side of the cushion pad is seperated from the underside of the pedal by a separation sheet of smooth, slippery material that lets the pedal rotate around the socket without sticking to the pad. The present invention lets the pedal twist left or right for toe-in or toe-out positioning as guided by a foot without friction from commonly manufactured cushion pads. The cushion pad provides supplemental support and ease of control for heel to toe axis pivoting of the foot.

The pedal combines cushioned dampening with a pivoting point that lets pressures from opposite sides of the foot offset each other to improve leg-foot alignment and permit more complete muscle activation and control than other pedals. Different density cushioning mediums can be used to suit requirements of the user.

BRIEF DESCRIPTION OF THE DRAWINGS

The invention will be better understood, and objects other than those set forth above will become apparent when consideration is given to the following detailed description thereof. Such description makes reference to the drawings wherein.

DETAILED DESCRIPTION OF THE INVENTION

Figure 1:
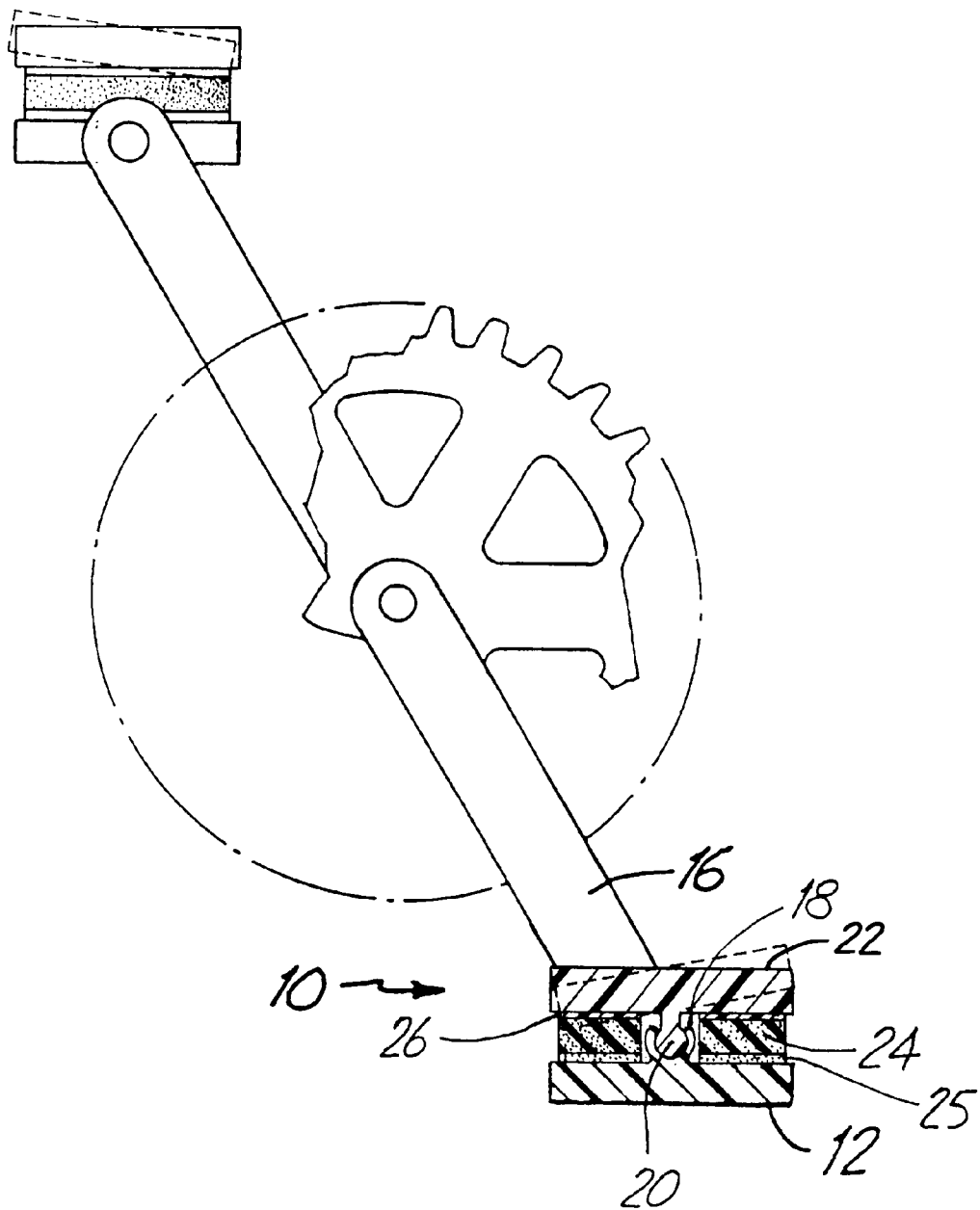
FIG. 1 is a side plan view of a pedal.

The preferred embodiment of the invention will be described in detail with reference to the drawings, wherein like reference numerals represent like parts and assemblies throughout the several views. Reference to the preferred embodiment does not limit the scope of the invention, which is limited only by the scope of the claims attached hereto.

Figure 2:
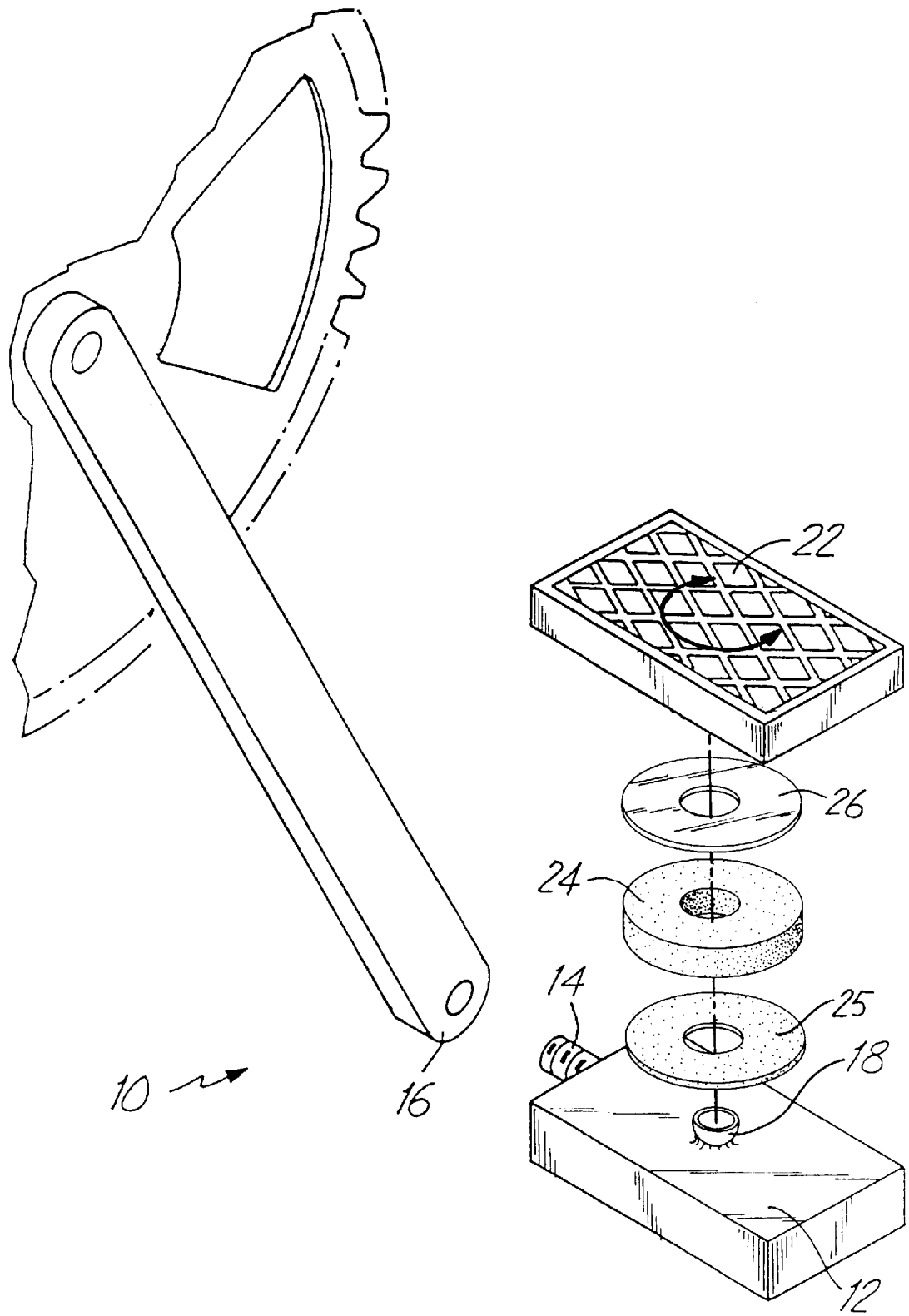
FIG. 2 is an exploded perspective view of the present invention.
Figure 3:
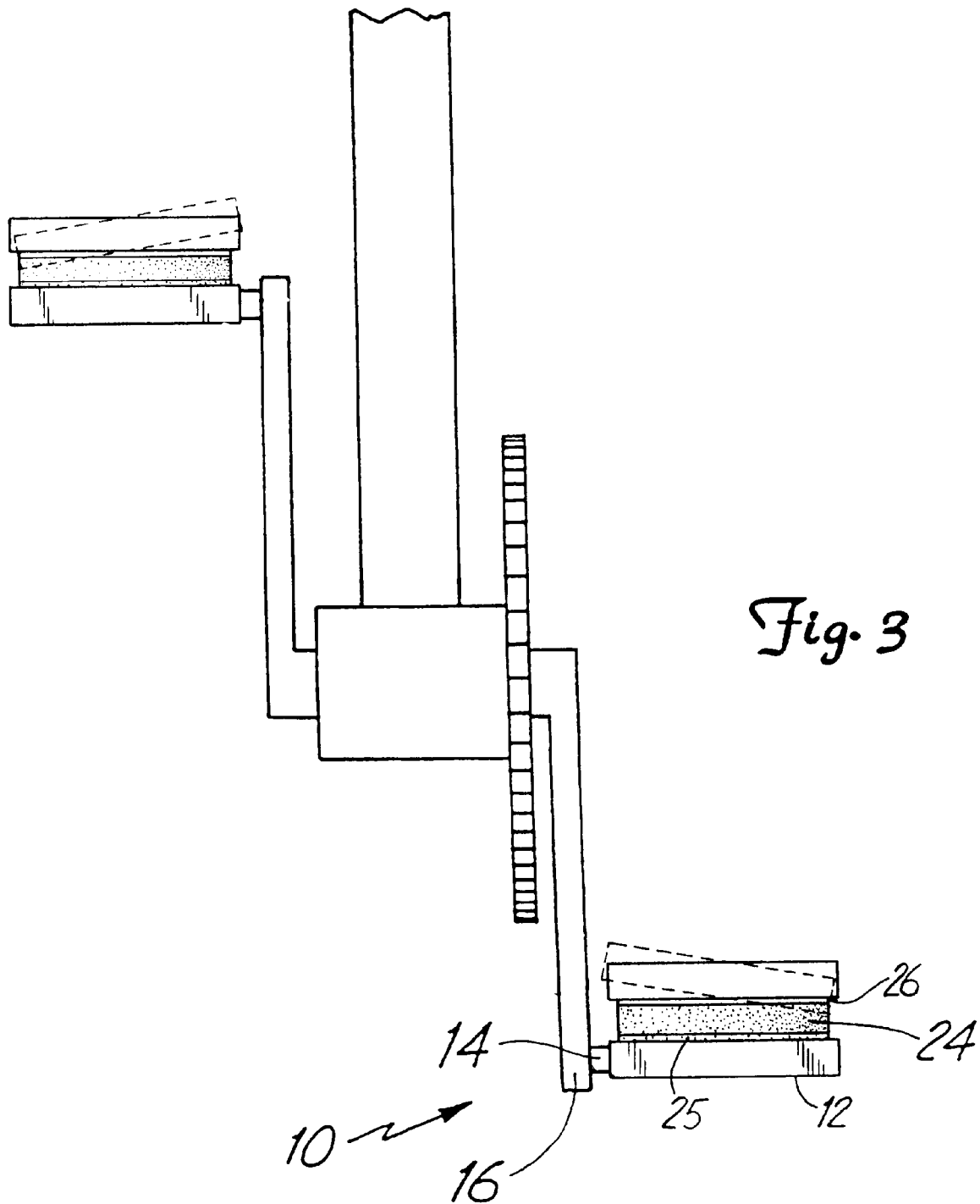
FIG. 3 is a perspective view of a pedal according to principles of the present invention.

Referring now to FIGS. 1–3, the reference numeral 10, generally designates an embodiment of the pedal according to the present invention. The pedal 10 includes a shaft housing 12 having first and second oppositely disposed ends and a socket-shaped support 18 between the ends which serves as a heel to toe axis and multi-directional pivoting support. A rotatable shaft 14 is positioned coaxially within the housing 12. A threaded first end of shaft 14 is connectable to a crank 16. Pedal frame 22 contains a ball-shaped extension 20 that is press fit into socket-shaped support 18 for a ball and socket type pivoting arrangement. A cushion pad 24 is attached with an adhesive side 25 to the shaft housing 12 and seperated from the underside of pedal frame 22 by separation sheet 26 which is made from Teflon or other slippery material to let pedal frame 22 rotate around support 18 easily with minimal sliding friction from cushion pad 24.

While the invention has been described in conjunction with a specific embodiment thereof, it is evedent that different alternatives, modifications, variations, and uses will be apparent to those skilled in the art in view of the foregoing description. Accordingly, the invention is not limited to these embodiments or the use of elements having specific configurations and shapes as presented herein.

What is claimed is:

1. A pedal comprising:
   (a) a pedal housing having a first end and a second end, an axis extending between the first end and the second end about which the pedal housing can rotate, and a pivoting support means provided between the first end and the second end of the pedal housing;
   (b) a shaft having a first end and a second end, the first end of said shaft being rotatably positioned within the first end of said housing along the axis, and the second end of said shaft being connectable to a crank;
   (c) a pedal frame pivotally attached to said housing about said pivoting support means;
   (d) a cushion provided between said pedal housing and said pedal frame for providing cushioning when said pedal frame is pivoted relative to said pedal housing; and
   (e) a friction reducing material provided between the pedal frame and the cushion.

2. A pedal according to claim 1, wherein the friction reducing material comprises a separation sheet.

3. A pedal according to claim 2, wherein said separation sheet comprises a polytetrafluoroethylene sheet.

4. A pedal according to claim 1, wherein said pivoting support means comprises a ball and socket pivoting arrangement.

5. A pedal according to claim 1, wherein the pivoting support means allows the pedal frame to pivot between toe in and toe out positions.

6. An exercise machine comprising at least one pedal, said pedal comprising:
   (a) a pedal housing having a first end and a second end, an axis extending between the first end and the second end about which the pedal housing can rotate, and a pivoting support means provided between the first end and the second end of the pedal housing;
   (b) a shaft having a first end and a second end, the first end being of said shaft rotatably positioned within the first end of said housing along the axis, and the second end of said shaft being connectable to a crank;

(c) a pedal frame pivotally attached to said housing about said pivoting support means;

(d) a cushion provided between said pedal housing and said pedal frame for providing cushioning when said pedal frame is pivoted relative to said pedal housing; and (e) friction reducing material provided between the pedal frame and the cushion.

7. An exercise machine according to claim 6, wherein the friction reducing material comprises a separation sheet.

8. A pedal according to claim 7, wherein said separation sheet comprises a polytetrafluoroethylene sheet.

9. An exercise machine according to claim 6, wherein the pivoting support means allows the pedal frame to pivot between toe in and toe out positions.

10. An exercise machine according to claim 6, wherein the exercise machine is a bicycle.

11. An exercise machine according to claim 6, wherein the exercise machine is a stationary bicycle.

\* \* \* \* \*